(12) United States Patent
Aoki et al.

(10) Patent No.: US 7,641,833 B2
(45) Date of Patent: Jan. 5, 2010

(54) METHOD FOR PRODUCING A PELLET FROM A FIBER-FILLED RESIN COMPOSITION AND INJECTION-MOLDED PRODUCTS THEREOF

(75) Inventors: Kei Aoki, Fuji (JP); Masayuki Sakai, Fuji (JP); Kazufumi Watanabe, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 441 days.

(21) Appl. No.: 10/594,679

(22) PCT Filed: Apr. 12, 2005

(86) PCT No.: PCT/JP2005/007368

§ 371 (c)(1),
(2), (4) Date: Sep. 28, 2006

(87) PCT Pub. No.: WO2005/099984

PCT Pub. Date: Oct. 27, 2005

(65) Prior Publication Data

US 2007/0194478 A1  Aug. 23, 2007

(30) Foreign Application Priority Data

Apr. 15, 2004  (JP)  .............................. 2004-120860

(51) Int. Cl.
*B29C 47/60* (2006.01)
*B29B 7/24* (2006.01)

(52) U.S. Cl. .................. 264/211.23; 264/108; 264/142; 264/211.21; 264/328.18; 366/76.1; 366/76.6; 366/76.91; 366/160.1; 366/162.1

(58) Field of Classification Search ................. 264/140, 264/141, 145, 108, 142, 211.21, 211.22, 264/211.23, 328.18; 366/76.1, 76.6, 76.91, 366/160.1, 162.1
See application file for complete search history.

(56) References Cited

U.S. PATENT DOCUMENTS 3,453,356 A * 7/1969 Kent, Jr. et al. ............. 264/143

(Continued)

FOREIGN PATENT DOCUMENTS

JP           59-26237          2/1984

(Continued)

OTHER PUBLICATIONS

Machine English Translation of JP06240114 (the Japanese version is already of record).*
English machine translation of JP 06240114, retrieved online Feb. 6, 2009 from JPO.*

*Primary Examiner*—Joseph S. Del Sole
*Assistant Examiner*—Timothy Kennedy
(74) *Attorney, Agent, or Firm*—Nixon & Vanderhye P.C.

(57) ABSTRACT

An object of the present invention is to economically produce a resin composition pellet with the degradation of resin suppressed, by using an ordinary extruder, the resin composition pellet being filled with a desired filling amount of a uniformly compounded fibrous filler, and having a required weight average fiber length, in particular, to produce a resin composition pellet used for a socket of a planar socket pin in which the pitch interval of a lattice area of a semiconductor device is 2.0 mm or less, the thickness of the lattice area is 0.5 mm or less, and the height of the socket is 5.0 mm or less. To achieve the object, in supplying 80 to 55% by weight of resin and 20 to 45% by weight of the fibrous filler with a weight average fiber length of 1 mm or more to an extruder to produce a resin composition pellet in which a weight average fiber length of a fibrous filler is 180 to 360 μm, a part of an amount (x) of the resin is supplied through a main feed port of the extruder, and the fibrous filler and a remaining amount (1−x) of the resin are supplied through a side-feed port so that x/(1−x) becomes 50/50 to 10/90% by weight.

7 Claims, 2 Drawing Sheets

U.S. PATENT DOCUMENTS

| | | | | |
|---|---|---|---|---|
| 4,213,747 A | * | 7/1980 | Friedrich | 425/144 |
| 4,252,755 A | * | 2/1981 | Normanton et al. | 264/45.9 |
| 4,534,652 A | * | 8/1985 | Stade | 366/85 |
| 4,976,904 A | * | 12/1990 | Bilhorn | 264/104 |
| 5,110,896 A | * | 5/1992 | Waggoner et al. | 528/190 |
| 5,149,486 A | * | 9/1992 | Baba | 264/553 |
| 5,185,117 A | * | 2/1993 | Hawley | 264/211.12 |
| 5,264,174 A | * | 11/1993 | Takei et al. | 264/211.23 |
| 5,318,431 A | * | 6/1994 | Chang et al. | 425/200 |
| 5,358,693 A | * | 10/1994 | Brinkmann et al. | 422/137 |
| 5,401,154 A | * | 3/1995 | Sargent | 425/114 |
| 5,422,049 A | * | 6/1995 | Kruger et al. | 264/464 |
| 5,437,826 A | * | 8/1995 | Martinello et al. | 264/102 |
| 5,441,801 A | * | 8/1995 | Deaner et al. | 428/326 |
| 5,536,613 A | * | 7/1996 | Chang et al. | 430/137.1 |
| 5,830,395 A | * | 11/1998 | Vercesi et al. | 264/101 |
| 5,883,159 A | * | 3/1999 | Koizumi et al. | 523/217 |
| 5,938,994 A | * | 8/1999 | English et al. | 264/102 |
| 6,063,848 A | * | 5/2000 | Murakami et al. | 524/413 |
| 6,121,369 A | * | 9/2000 | Stack et al. | 524/495 |
| 6,221,962 B1 | * | 4/2001 | Heino et al. | 525/133 |
| 6,582,640 B2 | * | 6/2003 | Willemse | 264/119 |
| 6,641,387 B1 | * | 11/2003 | Letroublon et al. | 425/560 |
| 6,652,796 B1 | * | 11/2003 | Moriwaki et al. | 264/328.18 |
| 6,726,464 B1 | * | 4/2004 | Kato et al. | 425/203 |
| 7,410,687 B2 | * | 8/2008 | Dolinar | 428/292.1 |
| 2003/0152793 A1 | * | 8/2003 | Willemse | 428/542.8 |
| 2004/0068037 A1 | * | 4/2004 | Mitadera et al. | 524/445 |
| 2005/0040555 A1 | * | 2/2005 | Caretta et al. | 264/211.21 |
| 2005/0087904 A1 | * | 4/2005 | Bryan | 264/148 |
| 2006/0049541 A1 | * | 3/2006 | Sutton et al. | 264/148 |
| 2006/0103045 A1 | * | 5/2006 | O'Brien-Bernini et al. | 264/45.9 |
| 2008/0093763 A1 | * | 4/2008 | Mancosh et al. | 264/75 |

FOREIGN PATENT DOCUMENTS

| | | |
|---|---|---|
| JP | 6-238655 | 6/1994 |
| JP | 6-240114 | 8/1994 |
| JP | 10-258424 | 9/1998 |

* cited by examiner

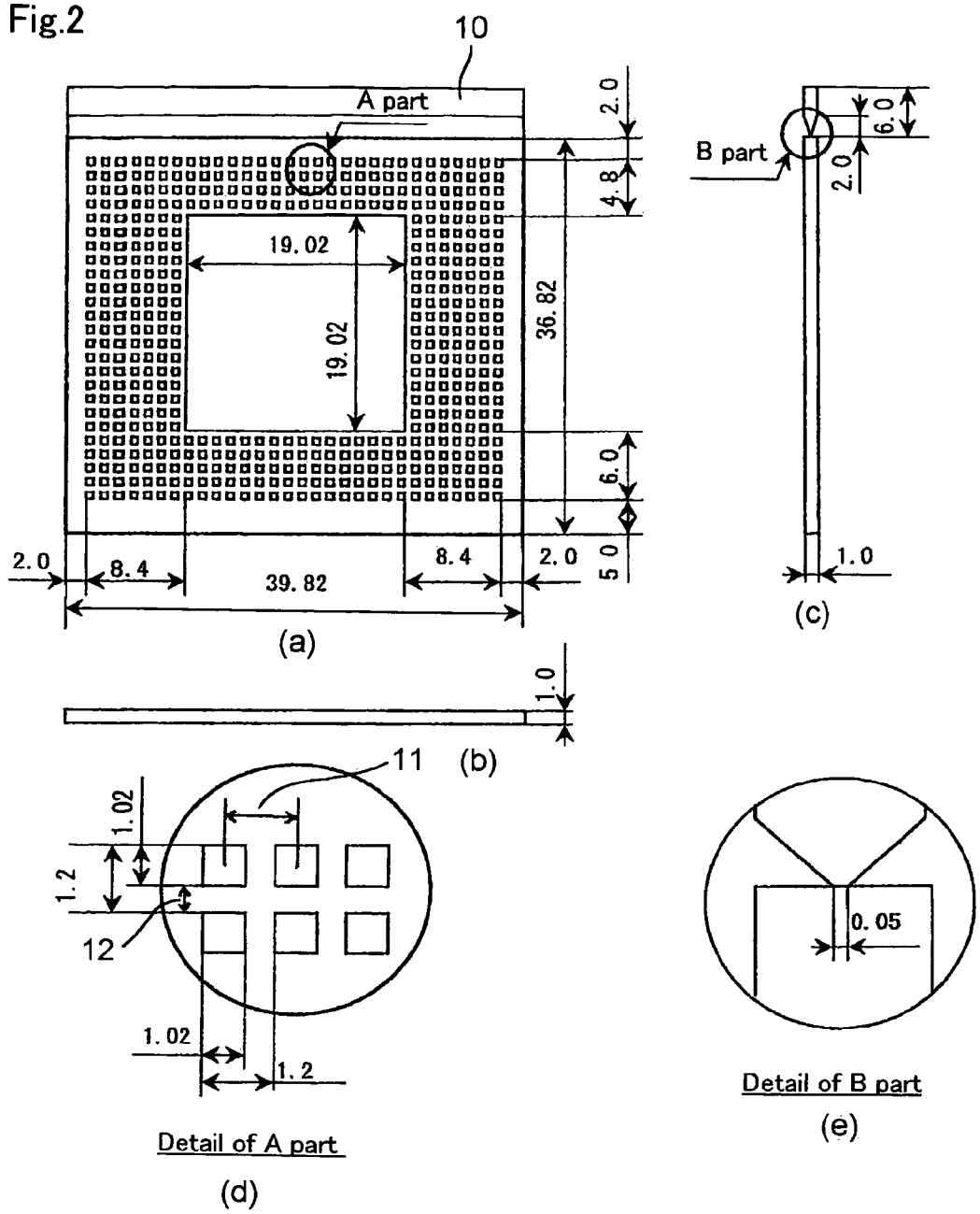

METHOD FOR PRODUCING A PELLET FROM A FIBER-FILLED RESIN COMPOSITION AND INJECTION-MOLDED PRODUCTS THEREOF

This application is the US national phase of international application PCT/JP2005/007368 filed 12 Apr. 2005 which designated the U.S. and claims benefit of JP 2004-120860, dated 15 Apr. 2004, the entire content of which is hereby incorporated by reference.

BACKGROUND OF THE INVENTION

1. Field of the Invention

The present invention relates to a method for economically producing a resin composition pellet having a particular weight average fiber length, and furthermore having a particular fiber length distribution, by adding a fibrous filler to resin with an extruder. The resin composition pellet is suitable for molding a socket for a pin of a semiconductor device, in particular, a socket in which a pitch interval of a lattice area provided with a number of pin holes is 2 mm or less.

2. Description of the Related Art

Conventionally, in the case of kneading glass fibers or the like with a resin using an extruder, when injection molding is performed using a pellet obtained by inputting the resin through a main feed port and side-feeding fibers, under the condition that the melt viscosity of the resin is very low, the following problem arises. In the case of molding, for example, a socket of a semiconductor device with a narrow pitch interval, a completely filled molded product is not obtained since sufficient flowability is not obtained. Alternatively, the deformation amount of warping of a socket obtained due to the high injection pressure caused by forceful filling increases.

JP 06-240114 A (see claim 1, Table 1 of Example 1) describes that a resin composition pellet which is obtained by filling (A) 100 parts by weight of at least one liquid crystalline resin selected from a liquid crystalline polyester resin and/or a liquid crystalline polyester amide resin forming an anisotropic molten phase with (B) 5 to 300 parts by weight of glass fibers with an average fiber diameter of 3 to 15 μm, and in which the weight average fiber length is in a range of 0.02 to 0.55 mm, the proportion of glass fibers with a fiber length exceeding 1 mm is 0 to 15% by weight, and the proportion of glass fibers with a fiber length of 0.1 mm or less is 0 to 50% by weight, is injection-molded, and the flow length during injection molding, the shrinkage ratio of a molded product, surface impact strength, and the like have been obtained.

However, according to this technique, the weight ratio and average fiber length of the glass fibers are not controlled freely in desired glass fiber filling.

SUMMARY OF THE INVENTION

An object of the present invention is to provide a method for economically producing a resin composition pellet while suppressing the degradation of the resin, by a simple method using an ordinary extruder, the resin composition pellet being filled with a desired filling amount of a uniformly compounded fibrous filler, and having a required weight average fiber length (l) and particular properties in the case of being subjected to injection molding.

In particular, an object of the present invention is to provide a method for producing a resin composition pellet with a fibrous filler compounded therein, the resin composition pellet being used for a planar socket in which the pitch interval of a lattice area of a semiconductor device is 2.0 mm or less, the thickness of the lattice area is 0.5 mm or less, and the height of the socket is 5.0 mm or less.

The inventors of the present invention have found that the above-mentioned problems can be solved by supplying a small amount of resin through a main feed port, and side-feeding a fibrous filler with the remaining a large amount of resin, and thus, have achieved the present invention.

That is, a first invention provides a method for producing a resin composition pellet in which a weight average fiber length (l) of a fibrous filler (B) is 180 to 360 μm, including supplying 80 to 55% by weight of resin (A) and 20 to 45% by weight of the fibrous filler (B) with a weight average fiber length (L) of 1 mm or more (herein, a total of the resin (A) and the fibrous filler (B) is 100% by weight) to an extruder, in which:

a part of an amount (x) of the resin (A) is supplied through a main feed port of the extruder; and the fibrous filler (B) and a remaining amount (1−x) of the resin (A) are supplied through a side-feed port provided backward in an extrusion direction from the main feed port so that a weight ratio of x/(1−x) is 50/50 to 10/90.

A second invention provides a method for producing a resin composition pellet according to the first invention, in which a proportion of the fibrous filler (B) with a fiber length exceeding 300 μm in the resin composition pellet is 5 to 40% by weight.

A third invention provides a method for producing a resin composition pellet according to the first or second invention, in which the resin composition pellet is obtained by one-pass treatment with the extruder.

A fourth invention provides a method for producing a resin composition pellet according to any one of the first to third inventions, in which the resin (A) is a liquid crystalline polymer.

A fifth invention provides a method for producing a resin composition pellet according to any one of the first to fourth inventions, in which the fibrous filler (B) is glass fibers and/or carbon fibers.

A sixth invention provides a method for producing a resin composition pellet according to any one of the first to fifth inventions, wherein the resin composition pellet is used for a planar socket in which a pitch interval of a lattice area provided with a number of pin holes is 2.0 mm or less, a thickness of the lattice area is 0.5 mm or less, and a height of the socket is 5.0 mm or less.

A seventh invention provides a method for producing a resin composition pellet according to any one of the first to sixth inventions, in which the extruder is a twin-screw extruder, a ratio between a screw length and a screw diameter (L/D) is 20 or more, a screw has a plasticizing zone and a kneading zone, and the side-feed port is positioned on a downstream side of the plasticizing zone.

An eighth invention provides a method for producing a resin composition pellet according to any one of the first to seventh inventions, in which a melt viscosity of the resin composition pellet is 10 to 55 Pa·s.

A ninth invention provides a method for producing a resin composition pellet according to any one of the first to eighth inventions, in which a molded product obtained by molding a resin composition pellet by injection molding has a flexural modulus of 15,000 MPa or more, a flatness before solder reflow treatment of 0.09 mm or less, and a difference in flatness before and after heating corresponding to the solder reflow treatment at a peak temperature of 230 to 280° C. of 0.02 mm or less.

BRIEF DESCRIPTION OF THE DRAWINGS

FIG. 2 is a view showing an example of an injection-molded product according to the present invention.

Figure 1:
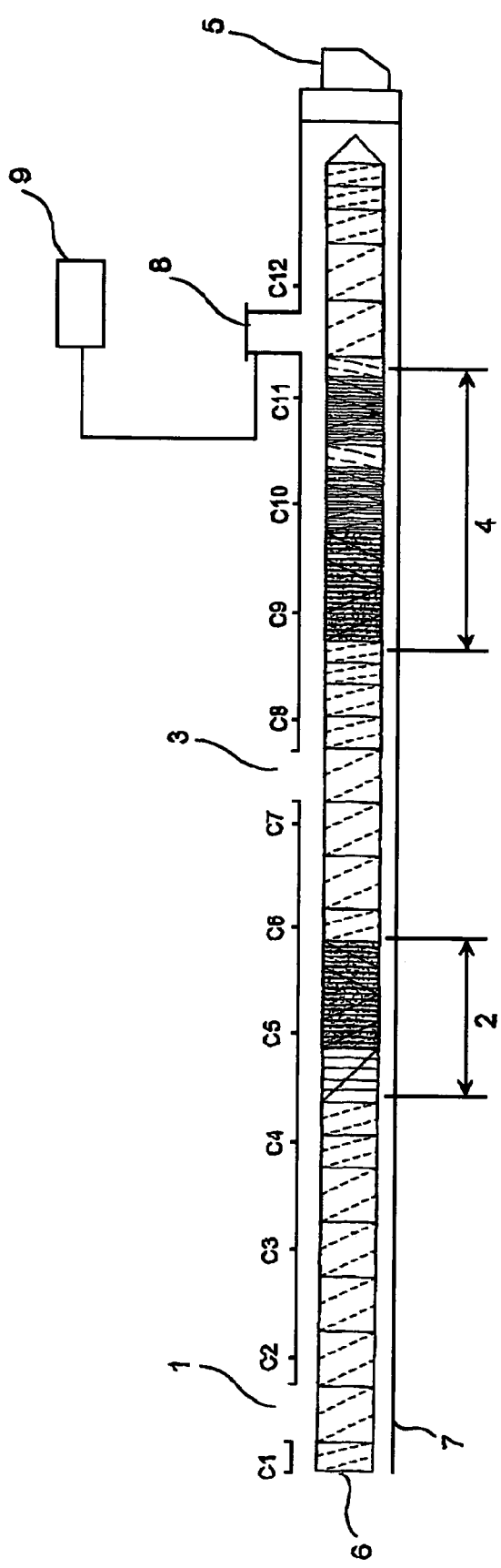
FIG. 1 is a view showing an example of an extruder used in the present invention.

Explanation of mark: main feed port 1, plasticizing zone 2, side-feed port 3, kneading zone 4, extrusion die 5, screw 6, cylinder 7, vent port 8, decompression device 9, resin well 10, pitch interval 11, and lattice area 12

BEST MODE FOR CARRYING OUT THE INVENTION

Hereinafter, the present invention will be described by way of an embodiment.

Extruder

The extruder according to the present invention includes a main feed port 1, a plasticizing zone 2, a side-feed port 3, a kneading zone 4, an extrusion die 5 for an obtained resin composition, a screw 6, a cylinder 7, and a vent port 8 and a decompression device 9 provided if required.

The side-feed port 3 may be positioned at one place or a plurality of places.

It is not necessary to use as the extruder the one having a special configuration. For example, a conventionally used one can be used as it is. More specifically, the extruder may be of a single-screw type or a twin-screw type. In the twin-screw type, a single flight to a triple flight of co-rotating type can be used, and a parallel axis or a oblique axis of counter-rotating type, and an incomplete intermeshing type may be used.

There are no particular limits to the screw diameter of an extruder, the ratio of a screw length/a screw diameter (L/D), the screw design, the screw rotation number, the screw driving force, and the heating and cooling ability, and those which enable the present invention to be carried out may be selected.

Usually, as screw elements for determining a screw design, there are an element for transportation comprising a forward flight, an element for the plasticizing zone, and an element for the kneading zone. In the present invention, the screw designs of the plasticizing zone and the kneading zone in the extruder should be appropriately designed in accordance with the properties of resin and the kind of a filler.

However, in order to control a fibrous filler (B) with a weight average fiber length (L) to a predetermined weight average fiber length (l) and a fiber length distribution, as described later, the length of the screw (L/D), the length of the plasticizing zone (L/D), the length of the kneading zone (L/D), and the screw design are selected regarding the extruder so that the present invention can be carried out, since they also have an influence.

In the case of a twin-screw extruder, generally, in the plasticizing zone and the kneading zone, screw elements such as a reverse flight, a seal ring, a forward kneading disk, and a reverse kneading disk are configured in combination.

In order to compound 20 to 45% by weight of the fibrous filler (B) such as glass fibers in the resin (A) with a relatively low melt viscosity such as a liquid crystalline polymer, and extrude them in a strand shape, it is preferable that the kneading zone be set to be longer than the plasticizing zone.

Furthermore, in order to provide a vent port to perform evacuation under reduced pressure, it is preferable that a seal section be completely filled with the molten resin composition in the extruder be provided. In the case of a twin-screw extruder, it is preferable to use as the shape of a screw constituting the seal section each of those which have the ability to increase a pressure geometrically with respect to the rotation of the screw, such as a reverse flight, a seal ring, and a reverse kneading disk. Furthermore, if required, an element such as a kneading disk may be combined.

Usually, evacuation under reduced pressure is performed on a downstream side of the kneading zone, and the kneading zone also functions as the seal section. In the case of performing evacuation under reduced pressure of resin supplied through a main feed port and plasticized, before inputting a fibrous filler, it is preferable that the seal section be provided between the vent port and the side-feed port.

The L/D (screw length/screw diameter) of the extruder is 20 or more, preferably 20 to 80, and more preferably 25 to 60.

The L/D of the plasticizing zone is preferably 2 to 15, and more preferably 3 to 10, although depending upon the design of the screw and operation conditions. An excessively small length (L/D) of the plasticizing zone is not preferable because the plasticization of the resin becomes insufficient, and the side-fed fibrous filler is broken too much. An excessively large length (L/D) of the plasticizing zone is not preferable because the resin is decomposed to cause inconvenience such as the decrease in physical properties and the generation of gas.

The L/D of the kneading zone is preferably 2 to 25, and more preferably 5 to 15, although depending upon the design of the screw and operation conditions. An excessively small length (L/D) of the kneading zone is not preferable because the breakage of the fibrous filler becomes insufficient, and the flowability decreases. An excessively large the length (L/D) of the kneading zone is not preferable because heat generation increases to cause inconvenience such as the decomposition and carbonization of the resin, and the generation of gas.

The supply of the resin to the main feed port 1 and the supply of the filler and resin to the side-feed port 3 are performed via a constant-mass or constant-capacity supply device. The constant supply device may be any of a belt style, a screw style, and a vibration style.

The filler and the resin are supplied separately or in the mixture to the side-feed port 3, preferably using individual constant supply devices. More specifically, a side surface feed method involving supplying from a side surface of a cylinder barrel of an extruder with a screw feeder, a method involving supplying from the upper portion of a cylinder to an extruder with a vertical screw feeder, a method involving directly dropping a sub-material to a feed port, and the like. The side-feed port 3 is preferably provided in the upper portion.

In the side-feed port 3, a water-cooling jacket may be provided if required to suppress the change in the resin and the filler, although there is no limit.

Resin

There is no particular limit to the resin (A) used in the present invention. However, it is preferable to use the resin with a melt viscosity of 1,000 Pa·s or less, more preferably 50 to 500 Pa·s, and still more preferably 10 to 100 Pa·s at a temperature higher by 15° C. than a melting point, and at a shear rate converted to 100/s.

Examples of the resin (A) include a liquid crystalline polymer, a linear chain PPS, nylon 6, nylon 66, and nylon 610. Of those, the liquid crystalline polymer is preferable.

Examples of the liquid crystalline polymer include liquid crystalline polyester and liquid crystalline polyamide. Specific examples thereof include: a combination of a para-hydroxybenzoic acid residue and a 2,6-hydroxynaphthalene carboxylic acid residue; a combination of a para-hydroxybenzoic acid residue, a residue of an aromatic divalent hydroxy compound such as biphenol or hydroquinone, and a residue of an aromatic dicarboxylic acid such as terephthalic acid, isophthalic acid, or naphthalene dicarboxylic acid; a combination of a para-hydroxybenzoic acid residue, an aliphatic diol residue, and an aromatic dicarboxylic acid residue; and a combination further including a p-aminophenol residue or a copolymerized polyethyleneterephthalate and p-hydroxybenzoic acid which has a partially aliphatic group to the above combinations.

At least the resin (A) supplied through the side-feed port 3 is powder with a grain diameter of 50 μm or more, preferably 500 μm or more, and more preferably a pellet with a length of a smallest side or a diameter of 1 mm or more. When the grain diameter and the like are smaller than the above ranges, the resin is melted immediately after side-feeding, which makes it difficult to feed the fibrous filler with the weight average fiber length (L), and uniformly knead it to a weight average fiber length (l) in a predetermined range. Furthermore, it becomes difficult to obtain a predetermined fiber length distribution.

In the case where the resin (A) is a mixture of at least two kinds, the kind of the resin supplied through the main feed port 1 may be the same as or different from the kind of the resin supplied through the side-feed port 3. For example, in the case where the resin (A) is a mixture of a liquid crystalline polymer 1 and a liquid crystalline polymer 2, the liquid crystalline polymer 1 may be supplied through the main feed port 1, and the liquid crystalline polymer 2 and the fibrous filler may be supplied through the side-feed port 3.

Fibrous Filler

Examples of the kind of the fibrous filler (B) include glass fibers, carbon fibers, polyethylene fibers, polypropylene fibers, polyester fibers, polyamide fibers, fluorine fibers and the like. Glass fibers and carbon fibers are preferable. The fibrous filler may be a mixture of at least two kinds.

The fibrous filler (B) may be pretreated with various kinds of silane-based or titanium-based coupling agents.

The glass fibers may be treated with epoxy-based, urethane-based, or acryl-based coating, or a binder.

The weight average fiber length (L) of the fibrous filler (B) before side-feeding is 1 mm or more, preferably 1 to 10 mm, and more preferably 2 to 10 mm.

The fiber has an ordinary diameter (e.g., 3 to 15 μm). When the average diameter of the fiber is much smaller than 3 μm, the effect as a reinforcing material is small, and in the case of a liquid crystalline polymer, an anisotropy reduction effect is small. On the other hand, when the average diameter is much larger than 15 μm, the moldability decreases, and the outer appearance of the surface degrades.

Furthermore, a chopped strand is preferable, which is uniformly aligned without a distribution in the length of the fibrous filler (B) before side-feeding.

Resin Composition

The mass ratio between the resin (A) and the fibrous filler (B) in a resin composition pellet to be obtained is 55 to 80% by weight of the resin (A) and 45 to 20% by weight of the fibrous filler (B), preferably, 60 to 70% by weight of the resin (A) and 40 to 30% by weight of the fibrous filler (B) (herein, the total of the resin (A) and the fibrous filler (B) is 100% by weight).

When the proportion of the fibrous filler (B) is too large, the stiffness of a molded product to be obtained becomes large, while the flowability of the resin composition degrades to be difficult to be molded. When the proportion of the fibrous filler (B) is too small, the physical properties such as the stiffness of a molded product decrease, and warping deformation also degrades.

According to the present invention, a part (x) of the resin (A) is supplied through the main feed port of the extruder, and the fibrous filler (B) and the remaining amount (1−x) of the resin (A) are supplied through the side-feed port provided downstream in the extrusion direction from the main feed port in such a manner that the weight ratio x/(1−x) is 50/50-10/90, preferably 40/60-15/85.

When the amount of the resin (A) supplied through the side-feed port is larger or smaller than the above range, because of too much breakage or insufficient breakage, it is difficult to break the fibrous filler (B) to a predetermined weight average fiber length (l), and furthermore to a predetermined fiber length distribution.

In order to supply the fibrous filer (B) through the side-feed port, the fibrous filler is fed simultaneously with the resin or at a position upstream from the resin, whereby the breakage of the fibrous filler becomes appropriate.

The side-feed port 3 may be positioned at one place or two places. In the case where the side-feed ports 3 are positioned at two places, it is preferable to supply the fibrous filler through the side-feed port on the upstream side, and to supply the resin through the side-feed port on a downstream side. It is preferable that a screw positioned between the side-feed ports at two places be set to be a transportation zone of a full-flight, and that the kneading zone be positioned further downstream from these side-feed ports on the downstream side. Furthermore, the weight average fiber length (l) and the fiber length distribution can be finely adjusted in an intended property range by varying more or less the supply ratio of each feed port of the resin (A).

The weight average fiber length (l) of the fibrous filler (B) in the obtained pellet is 180 to 360 μm, preferably 200 to 300 μm, and more preferably 200 to 270 μm.

When the weight average fiber length (l) in the pellet is much shorter than the above range, sufficient stiffness at a high temperature cannot be obtained. When the weight average fiber length is much longer than the above range, the flowability becomes insufficient in the case of molding a molded product having a narrow flow path.

It is also important to consider the fiber length distribution. It is preferable that, in the fibrous filler (B) in the resin composition pellet, the proportion of the filler having a fiber length exceeding 300 μm be 5 to 40% by weight, preferably 10 to 30% by weight.

When the proportion of the filler having a fiber length exceeding 300 μm is much larger than the above range, the flowability becomes insufficient in the case of molding a molded product having a narrow flow path. When the proportion of the filler having a fiber length exceeding 300 μm is much smaller than the above range, physical properties such as the stiffness and the flatness of an injection-molded product degrade.

The weight average fiber length (l) and its distribution are obtained by a mass measurement method or computer processing of an image observed with a microscope, after the resin is burnt or dissolved.

To the extent that the weight average fiber length (l) and its distribution of the fibrous filler (B) in the resin composition pellet are maintained in the above ranges, a part of the strand obtained from an extruder die 5 or the pellet obtained therefrom may be circulated in such a manner as to be added to the remaining (1−x) of the resin (A) to be side-fed. However, one-pass processing through the extruder is preferable. According to the one-pass processing, the physical properties of resin are hard to decrease. When the ratio at which the obtained pellet is circulated is too large, and the number of circulations is too large, the resin degrades to decrease the molecular weight or generate gas, and the fibrous filler (B) is broken too much, with the result that the weight average fiber length (l) and its distribution cannot be maintained in the above ranges.

Regarding the operation conditions of the extruder, the cylinder temperature is, for example, in a range of a melting point of the resin (A) to be a base (according to DSC measurement at a temperature rise speed of 20° C./min) to a melting point+50° C., and the screw rotation number is, for example, 150 to 500 rpm.

A resin additive and the like may be compounded as the sub-material in the resin. Examples of the resin additive exclude low bulk density powder (described later), and include a plasticizer, a thermal stabilizer, a lubricant, a blocking inhibitor, a crystallization nucleating agent, an antioxidant, a UV stabilizer, an antistatic agent, a flame retardant, a dripping agent, an anti-hydration agent, an antibacterial agent, a deodorizer, a deodorant, a filler (inorganic additive or organic additive) other than the fibrous filler (B), an extender, a coloring agent, or a mixture thereof. Those sub-materials are supplied through the main feed port 1 and/or the side-feed port 3 if required.

The resin compositions with those additives added thereto are also included in the scope of the resin composition according to the present invention.

Molding of a Resin Composition Pellet

Regarding the resin composition pellet obtained in the above, there is no particular limit to a molding method. However, injection molding and the like are preferably used.

The melt viscosity (at a temperature higher by 15° C. than the melting point; shear rate 1,000/s) of the resin composition pellet is measured to be 55 Pa·s or less by a method described in a section of Examples. When the melt viscosity is too high, it is difficult to perform the injection molding because of the extremely high filling pressure, and the warping deformation amount of a molded product becomes large when forceful filling is performed.

The molded product obtained by subjecting the resin composition pellet to injection molding has a flexural modulus of 15,000 MPa or more, a flatness of 0.09 mm or less before solder reflow treatment, and a difference in flatness of 0.02 mm or less before and after heating corresponding to solder reflow treatment at a peak temperature of 230 to 280° C.

Herein, the peak temperature refers to the highest reached temperature in the solder reflow treatment.

Regarding the solder reflow treatment, for example, the treatment by heating with infrared rays (IR) is preferably used.

The heating corresponding to the solder reflow treatment refers to the heating at the above-mentioned temperature for a period of time required for reflow under the condition that a solder is not attached, and a component to be soldered is not mounted. The required heating time may be appropriately determined considering the size and shape of a molded product, the kind and printing amount of a solder to be printed, the shape, size, heat resistance, a component to be mounted, productivity and the like, assuming the case of actual soldering as usual.

Molding of a Socket for a Semiconductor Device

There is no particular limit to a method for obtaining the above-mentioned molded product having excellent flatness, particularly, a socket for a semiconductor device. However, an economical injection molding method is used preferably. In order to obtain a socket having excellent flatness by injection molding, it is important to use the above-mentioned resin composition, and it is preferable to select molding conditions under which a residual internal stress does not occur. In order to decrease the molding pressure to reduce the residual internal stress of a socket to be obtained, the cylinder temperature of a molding machine is preferably equal to or higher than the melting point T° C. of the resin (A). When the cylinder temperature is too high, there arises a problem such as the drooling of resin from a cylinder nozzle involved in the decomposition or the like of the resin. Therefore, the cylinder temperature is T° C. to (T+30)° C., preferably T° C. to (T+15)° C. Furthermore, the mold temperature is preferably 70 to 100° C. A low mold temperature is not preferable because the flow defect occurs in the resin composition for molding. An excessively high mold temperature is not preferable because there arises a problem such as the generation of flash. The injection speed is preferably 150 mm/s or more. When the injection speed is low, only a molded product which is not completely filled is obtained. When the molded product is forcefully filled completely, the residual internal stress of the molded product to be obtained increases owing to the high injection pressure, resulting in a socket with unsatisfactory flatness.

In the planar socket of the present invention, the pitch interval of a lattice area provided with a number of pin holes for a semiconductor device is 2.0 mm or less, preferably 1.5 mm or less; the thickness of the lattice area is 0.5 mm or less, preferably 0.2 mm or less, and the height of the socket is 5.0 mm or less, preferably 3.0 mm or less.

According to the present invention, one kind of the fibrous filler (B), such as commercially available glass fibers, is used and feeding of the fibrous filler can be performed satisfactorily, with an ordinary extruder having a side-feed port. Thus, a resin composition can be obtained by one-pass treatment with an extruder, so that the degradation of the resin is suppressed, and a resin composition pellet suitable for the above application can be produced very easily, stably, and economically.

EXAMPLES

Hereinafter, the present invention will be described more specifically by way of examples. It should be noted that the present invention is not limited to these examples.

Examples 1-4 and Comparative Examples 1-4

(1) Materials to be Used

Resin (A)

A liquid crystalline polymer pellet: Vectra E950i produced by Polyplastics Co., Ltd. (melting point: 335° C., melt viscosity: 30 Pa·s (350° C., shear rate 100/s), pellet size: about 5-3 mm×about 3-2 mm×about 3-1 mm)

Fibrous Filler (B)

Glass fibers (abbreviated as "GF"): CS03JA419 produced by Asahi Fiber Glass Co., Ltd. (chopped strand with a fiber diameter of 10 μm and a fiber length of 3 mm).

Resin Additive

Lubricant: Unister H-476 produced by NOF Corporation.

(2) Extruder

A twin-screw extruder PTE 65 produced by Mitsubishi Heavy Industries, Ltd. (screw diameter: 65 mm, L/D 36.8).

FIG. 1 schematically shows a screw of an extruder.

Main feed port 1: C1

Plasticizing zone 2: C4-C5 (Configuration: forward kneading, reverse kneading from the upstream side, length: 300 mm)

Side-feed port 3: C7

Kneading zone 4: C8-C11 (Configuration: forward kneading, reverse kneading, forward kneading, reverse kneading, reverse flight, forward kneading, reverse kneading, reverse flight from the upstream side, length: 520 mm)

Feeder to the main feedport: Screw-type loss-in-weight feeder produced by Kubota Corporation Feeder to the side-feed port For pellet resin: twin-screw side feeder produced by Kubota Corporation For glass fibers: belt-type loss-in-weight feeder produced by Kamacho Scale Co., Ltd.

(3) Extrusion condition

Cylinder temperature: The temperature of only the cylinder C1 provided with the main feed port 1 is 200° C., and the temperatures of the other cylinders are each 350° C.

Die temperature: 350° C.

(4) Method of Kneading and Extruding Resin Composition

Using the above-mentioned twin-screw extruder, the pellets of the liquid crystalline polymer were supplied through the main feed port 1 and the side-feed port 3, a lubricant was supplied through the main feed port 1, and glass fibers were supplied through the side-feed port 3. Side-materials were supplied through a side-material feed port using a double-spindle side feeder, and the supply amounts of the liquid crystalline polymer pellets, lubricant, and glass fibers were controlled with a weight feeder so as to have the ratio shown in Table 1.

The screw rotation number and throughput rate were set as shown in Table 1. The molten resin composition discharged in a strand shape from the die 5 was cooled with spray water while being transported by a mesh belt conveyer produced by Tanaka Seisakusho, and thereafter, cut to be pellets.

(Melt Viscosity of a Resin Composition)

The above-mentioned pellets were measured for a melt viscosity using a capillary type rheometer (Capiro Graph 1B produced by Toyo Seiki Kogyou Co., Ltd.) with L=20 mm and d=1 mm, at a temperature of 350° C. and a shear rate of 1,000/s in accordance with ISO 11443.

(Measurement of Weight Average Fiber Length (l) of Glass Fibers in Pellets)

Five grams of the resin composition pellets were heated at 600° C. for 2 hours to be incinerated. The remained ash was dispersed thoroughly in 5% polyethylene glycol aqueous solution, and transferred to a petri dish with a pipette, and glass fibers were observed with a microscope. Simultaneously, the weight average fiber length (l) of the glass fibers was measured using an image analysis apparatus LUZEX FS produced by NIRECO Corporation. In the analysis of an image, a sub-routine was applied in which overlapped fibers were separated from each other, and each length was obtained. The measurement was performed excluding the glass fibers of 50 μm or less.

(Injection Molding of Pellets)

The following test chip was produced from the pellets obtained in the above extrusion by using an injection molding machine, and evaluated to obtain results shown in Table 2.

Injection molding machine: FANUC α-50C (having an intermediate diameter and a long nozzle) produced by FANUC Ltd.

Cylinder temperature: 350° C. (on a nozzle side)-350° C.-340° C.-330° C.

Mold temperature: 80° C.

Injection speed: 200 mm/sec

Dwell pressure: 29 MPa

Filling time: 0.08 sec

Dwell time: 1 sec

Cooling time: 5 sec

Screw rotation number: 120 rpm

Screw back pressure: 0.5 MPa (Flexural Modulus of a Molded Product)

Measured in accordance with ISO 178.

(Measurement of the Flatness of a Socket)

A planar socket (number of pin holes: 494, thickness of the lattice area: 0.18 mm) as shown in FIG. 2 was injection-molded from resin composition pellets under the following molding condition: entire size of 39.82 mm×36.82 mm×1 mm (thickness), an opening (hole for setting a semiconductor device) of 19.02 mm×19.02 mm at the center, a lattice area provided with a number of pin holes in the circumferential portion of the opening, and a pitch interval of the lattice area of 1.2 mm. A film gate located at opposite face of a resin well was used as a gate, and the thickness of the gate was 3 mm.

FIG. 2(a) is a top view of the socket in which a number of pinholes are provided in a lattice shape. FIG. 2(d) shows the detail of an A portion in FIG. 2(a). FIG. 2(b) is a side view seen from the film gate side. FIG. 2(c) is a side view having a resin well in an upper portion. FIG. 2(e) shows the detail of a B portion in FIG. 2(c).

The socket thus obtained was allowed to stand still on a horizontal desk, and the height of the socket was measured by using an image measuring machine Quick Vision 404 PROCNC produced by Mitsutoyo Corportion. In this case, the region placed 0.5 mm from the end face of the socket was measured at an interval of 10 mm, and the difference between the maximum height and the minimum height was set to be flatness.

Furthermore, using a large tabletop reflow soldering device RF-300 produced by Japan Pulse Laboratories, Inc., the socket was heated under the condition corresponding to solder reflow (i.e., peak temperature: 250° C., and heating time: 5 minutes at the same temperature) without solder printing and components mounted thereon. After that, the flatness was measured by the above-mentioned method, which was set to be the difference in flatness before and after solder reflow.

TABLE 1

(feeding method, composition, and extrusion conditions)

| | Addition amount from main feed port 1 (% by weight) | | Addition amount from side-feed port 3 (% by weight) | | Resin supply weight ratio | Rotation rate | Throughput rate |
|---|---|---|---|---|---|---|---|
| | Resin | Lubricant | Resin | GF | x/(1 − x) | (rpm) | (kg/h) |
| Example 1 | 29.7 | 0.3 | 30 | 40 | 49.7/50.3 | 290 | 350 |
| Example 2 | 19.7 | 0.3 | 40 | 40 | 33/67 | 290 | 350 |
| Example 3 | 9.7 | 0.3 | 50 | 40 | 16.2/83.7 | 290 | 350 |
| Example 4 | 19.7 | 0.3 | 50 | 30 | 24.6/75.4 | 290 | 250 |

TABLE 1-continued (feeding method, composition, and extrusion conditions)

|  | Addition amount from main feed port 1 (% by weight) | | Addition amount from side-feed port 3 (% by weight) | | Resin supply weight ratio | Rotation rate | Throughput rate |
| --- | --- | --- | --- | --- | --- | --- | --- |
|  | Resin | Lubricant | Resin | GF | x/(1 − x) | (rpm) | (kg/h) |
| Comparative Example 1 | 34.7 | 0.3 | 25 | 40 | 58.1/41.9 | 290 | 350 |
| Comparative Example 2 | 44.7 | 0.3 | 25 | 30 | 55.9/44.1 | 290 | 250 |
| Comparative Example 3 | 59.7 | 0.3 | 0 | 40 | — | 290 | 250 |
| Comparative Example 4 | 59.7% by weight of resin, 0.3% by weight of a lubricant, and 40% by weight of GF were added through the main feed port 1. | | | | | 290 | 250 |

TABLE 2

(Resin composition, pellet of the resin composition, physical properties of injection-molded product, etc.)

|  | Weight average fiber length (μm) | Proportion of fibers of 300 μm or more (% by weight) | Melt viscosity (Pa · s) | Flexural modulus (GPa) | Flatness before reflow (mm) | Difference in flatness before and after reflow (mm) |
| --- | --- | --- | --- | --- | --- | --- |
| Example 1 | 337 | 34.2 | 47 | 16.0 | 0.075 | 0.014 |
| Example 2 | 245 | 22.5 | 40 | 15.6 | 0.047 | 0.010 |
| Example 3 | 206 | 19.4 | 38 | 14.3 | 0.057 | 0.009 |
| Example 4 | 279 | 26.8 | 44 | 15.8 | 0.059 | 0.010 |
| Comparative Example 1 | 374 | 43.6 | 47 | 16.9 | 0.092 | 0.010 |
| Comparative Example 2 | 415 | 55.1 | 49 | 18.0 | Cannot be filled completely | |
| Comparative Example 3 | 420 | 57.9 | 51 | 18.3 | Cannot be filled completely | |
| Comparative Example 4 | 150 | 10.4 | 35 | 13.2 | 0.071 | 0.068 |

INDUSTRIAL APPLICABILITY

According to the present invention, a resin composition pellet with the degradation of resin suppressed can be economically produced by a simple method using an ordinary extruder, the resin composition pellet being filled with a desired filling amount of a uniformly compounded fibrous filler, and having a required weight average fiber length (l) and particular properties in the case of being subjected to injection molding.

In particular, a resin composition pellet with a fibrous filler compounded therein can be produced, which is used for a semiconductor planar socket in which the pitch interval of a lattice area is 2.0 mm or less, the thickness of the lattice area is 0.5 mm or less, and the height of the entire product is 5.0 mm or less.

What is claimed is:

1. A method for producing a resin composition pellet comprised of a resin (A) and a fibrous filler (B), the method comprising:
    (a) supplying to an extruder an amount of 55 to 80% by weight of feed pellets comprised of the resin (A) and 20 to 45% by weight of the fibrous filler (B), the fibrous filler (B) having a weight average fiber length (L) of 1 mm or more based on the total weight of the resin (A) and the fibrous filler (B), wherein the step of supplying the resin (A) and the fibrous filler (B) to the extruder includes:
        (i) supplying one part containing an amount (x) of the feed pellets comprised of the resin (A) through a main feed port of the extruder; and
        (ii) supplying the fibrous filler (B) and a remaining part of the feed pellets comprised of the resin (A) containing an amount (1−x) through a side-feed port provided downstream of the main feed port in an extrusion direction of the extruder so that a weight ratio of x/(1−x) is 50/50 to 10/90
    (b) melt-blending the one and another parts of the resin (A) with the fibrous filler (B) within the extruder to achieve a weight average fiber length (l) of the fibrous filler (B) of 180 to 360 μm based on the total weight of the resin (A) and the fibrous filler (B), and thereafter
    (c) forming a pellet of the melt-blended resin (A) and the fibrous filler (B).

2. A method for producing a pellet according to claim 1, wherein 5 to 40% by weight of the fibrous filler (B) in the pellet has a fiber length exceeding 300 μm.

3. A method for producing a pellet according to claim 1, comprising melt-blending the resin (A) and the fibrous filler (B) in a one-pass treatment through the extruder.

4. A method for producing a pellet according to claim 1, wherein the resin (A) comprises a liquid crystalline polymer.

5. A method for producing a pellet according to claim 1, wherein the fibrous filler (B) comprises at least one filler selected from the group consisting of glass fibers and carbon fibers.

6. A method for producing a pellet according to claim 1, wherein the extruder comprises a twin-screw extruder having a plasticizing zone, a kneading zone and a ratio (L/D) between screw length (L) and screw diameter (D) of 20 or more, and wherein the side-feed port is positioned downstream of the plasticizing zone.

7. A method for producing a resin composition pellet according to claim 1, wherein the pellet has a melt viscosity of 10 to 55 Pa·s.